US012711641B2

(12) United States Patent
Hanca

(10) Patent No.: US 12,711,641 B2
(45) Date of Patent: Aug. 18, 2026

(54) ELECTRONIC DEVICE FOR OBTAINING DEPTH DATA OF IMAGE AND METHOD FOR CONTROLLING SAME

(71) Applicant: Samsung Electronics Co., Ltd., Suwon-si (KR)

(72) Inventor: Jan Hanca, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 327 days.

(21) Appl. No.: 18/545,070

(22) Filed: Dec. 19, 2023

(65) Prior Publication Data

US 2024/0212181 A1 Jun. 27, 2024

(30) Foreign Application Priority Data

Dec. 27, 2022 (KR) ........................ 10-2022-0186358

(51) Int. Cl.
*G06T 7/50* (2017.01)
*G06T 7/90* (2017.01)
*G06V 10/56* (2022.01)

(52) U.S. Cl.
CPC .................. *G06T 7/50* (2017.01); *G06T 7/90* (2017.01); *G06V 10/56* (2022.01); *G06T 2207/10024* (2013.01)

(58) Field of Classification Search
CPC ... G06T 7/50; G06T 7/90; G06T 2207/10024; G06T 3/4007; G06T 5/77; G06T 7/70; G06T 2207/10028; G06V 10/56
See application file for complete search history.

(56) References Cited

U.S. PATENT DOCUMENTS

| | | | |
|---|---|---|---|
| 9,443,350 B2 | 9/2016 | Wagner et al. | |
| 9,892,496 B2 | 2/2018 | Barron et al. | |
| 10,176,589 B2 | 1/2019 | Taguchi et al. | |
| 2015/0036926 A1 | 2/2015 | Choi et al. | |
| 2019/0197667 A1 | 6/2019 | Paluri | |
| 2020/0302683 A1 * | 9/2020 | Huang | G06T 15/503 |

FOREIGN PATENT DOCUMENTS

| | | |
|---|---|---|
| EP | 3022525 A1 | 5/2016 |
| KR | 10-1526465 B1 | 6/2015 |
| KR | 10-1714224 B1 | 3/2017 |
| WO | 2015/006790 A1 | 1/2015 |

* cited by examiner

*Primary Examiner* — Duy M Dang
(74) *Attorney, Agent, or Firm* — Jefferson IP Law, LLP

(57) ABSTRACT

An electronic device is provided. The electronic device includes a camera, at least one sensor, memory, and at least one processor operatively connected to the camera, the at least one sensor, and the memory, wherein the at least one processor is configured to obtain at least one piece of location information about the electronic device through the at least one sensor, obtain color data of a voxel structure, based on color data about an image obtained through the camera and the at least one piece of location information, obtain truncated signed distance field (TSDF) data of a voxel structure, based on depth data about the image obtained through the camera and the at least one piece of location information, and obtain color data and TSDF data about at least one voxel within a truncation distance, based on the color data of the voxel structure and the TSDF data of the voxel structure.

20 Claims, 8 Drawing Sheets

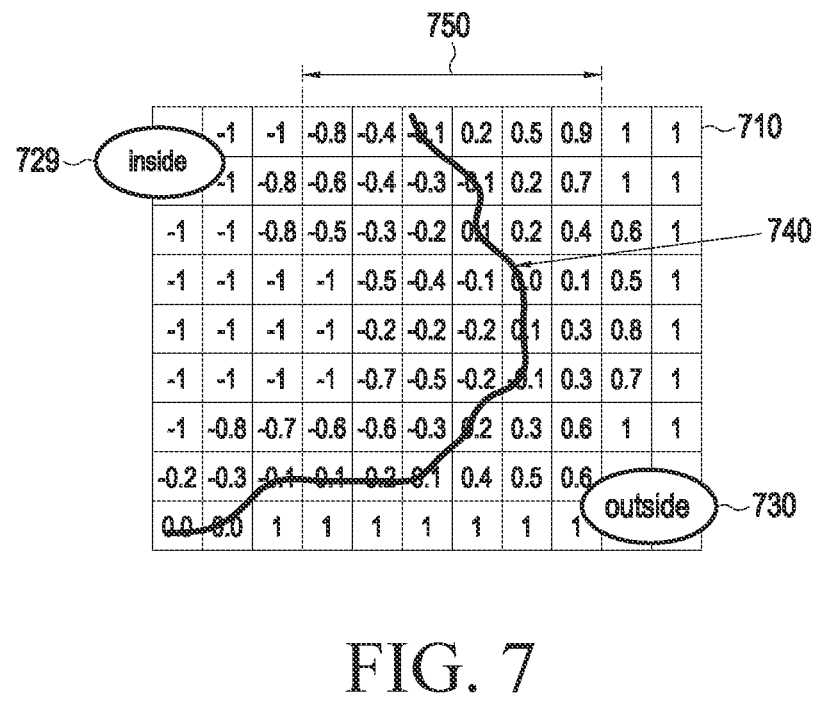

|  |  |  |  |  |  |  |  |  |  |  |
|---|---|---|---|---|---|---|---|---|---|---|
|  | -1 | -1 | -0.8 | -0.4 | -0.1 | 0.2 | 0.5 | 0.9 | 1 | 1 |
|  | -1 | -0.8 | -0.6 | -0.4 | -0.3 | -0.1 | 0.2 | 0.7 | 1 | 1 |
| -1 | -1 | -0.8 | -0.5 | -0.3 | -0.2 | 0.1 | 0.2 | 0.4 | 0.6 | 1 |
| -1 | -1 | -1 | -1 | -0.5 | -0.4 | -0.1 | 0.0 | 0.1 | 0.5 | 1 |
| -1 | -1 | -1 | -1 | -0.2 | -0.2 | -0.2 | 0.1 | 0.3 | 0.8 | 1 |
| -1 | -1 | -1 | -1 | -0.7 | -0.5 | -0.2 | -0.1 | 0.3 | 0.7 | 1 |
| -1 | -0.8 | -0.7 | -0.6 | -0.6 | -0.3 | 0.2 | 0.3 | 0.6 | 1 | 1 |
| -0.2 | -0.3 | -0.1 | -0.1 | -0.2 | -0.1 | 0.4 | 0.5 | 0.6 |  |  |
| 0.0 | 0.0 | 1 | 1 | 1 | 1 | 1 | 1 | 1 |  |  |

FIG. 7

ELECTRONIC DEVICE FOR OBTAINING DEPTH DATA OF IMAGE AND METHOD FOR CONTROLLING SAME

CROSS-REFERENCE TO RELATED APPLICATION(S)

This application is based on and claims priority under 35 U.S.C. § 119 (a) of a Korean patent application number 10-2022-0186358, filed on Dec. 27, 2022, in the Korean Intellectual Property Office, the disclosure of which is incorporated by reference herein in its entirety.

BACKGROUND

1. Field

The disclosure relates to an electronic device for obtaining depth data of an image and a method for controlling the same. More particularly, the disclosure relates to a camera, at least one sensor, memory, and at least one processor configured to be operatively connected to the camera, the at least one sensor, and the memory.

2. Description of Related Art

A gradually increasing number of various services and additional functions are provided through an electronic device, for example, a portable electronic device such as a smartphone. To increase the utility value of an electronic device and satisfy the needs of various users, communication service providers or electronic device manufacturers are competitively developing electronic devices to provide various functions and to be differentiated from other companies. Accordingly, various functions provided through an electronic device are becoming increasingly sophisticated.

To use an electronic device according to a surrounding space, for example, by using an autofocus, augmented reality, and spatial mapping, the electronic device may recognize the surrounding space by obtaining depth information about the surrounding space.

The electronic device obtains information about the distance per pixel between a camera imaging plane and an object as depth information, and may obtain depth information by using an active sensor, such as a time-of-flight (ToF) sensor, even when a surface has no texture or feature. The resolution of depth information obtained by the active sensor is highly related to power consumption.

Color information about an image of the surrounding space is used to increase the resolution of depth information, or depth information is predicted through learning, but using color information about an area with complex textures or selecting wrong training data may incur an error in depth information.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device for obtaining depth data of an image and a method for controlling the same.

Additional aspects will be set forth in part in the description which follows and, in part, will be apparent from the description, or may be learned by practice of the presented embodiments.

In accordance with an aspect of the disclosure, an electronic device is provided. The electronic device includes a camera, at least one sensor, memory, and at least one processor configured to be operatively connected to the camera, the at least one sensor, and the memory.

According to an embodiment of the disclosure, the at least one processor is configured to obtain at least one piece of location information about the electronic device through the at least one sensor.

According to an embodiment of the disclosure, the at least one processor is configured to obtain color data of a voxel structure, based on color data about an image obtained through the camera and the at least one piece of location information.

According to an embodiment of the disclosure, the at least one processor is configured to obtain truncated signed distance field (TSDF) data of a voxel structure, based on depth data about the image obtained through the camera and the at least one piece of location information.

According to an embodiment of the disclosure, the at least one processor is configured to obtain color data and TSDF data about at least one voxel within a truncation distance, based on the color data of the voxel structure and the TSDF data of the voxel structure.

In accordance with another aspect of the disclosure, a method for controlling an electronic device is provided. The method includes obtaining at least one piece of location information about the electronic device through at least one sensor.

According to an embodiment of the disclosure, the method for controlling the electronic device includes obtaining color data of a voxel structure, based on color data about an image obtained through a camera and the at least one piece of location information.

According to an embodiment of the disclosure, the method for controlling the electronic device includes obtaining truncated signed distance field (TSDF) data of a voxel structure, based on depth data about the image obtained through the camera and the at least one piece of location information.

According to an embodiment of the disclosure, the method for controlling the electronic device includes obtaining color data and TSDF data about at least one voxel within a truncation distance, based on the color data of the voxel structure and the TSDF data of the voxel structure.

In accordance with another aspect of the disclosure, one or more non-transitory computer-readable recording media storing computer-executable instructions that, when executed by a processor of an electronic device, configure the electronic device to perform operations are provided. The operations include obtaining at least one piece of location information about an electronic device through at least one sensor, obtaining color data of a voxel structure, based on color data about an image obtained through a camera and the at least one piece of location information, obtaining TSDF data of the voxel structure, based on depth data about the image obtained through the camera and the at least one piece of location information, and obtaining color data and TSDF data about at least one voxel within a truncation distance, based on the color data of the voxel structure and the TSDF data of the voxel structure.

According to an embodiment of the disclosure, the computer-executable instructions, when executed by a processor of an electronic device, configure the electronic device to obtain color data of a voxel structure, based on color data about an image obtained through the camera and the at least one piece of location information.

According to an embodiment of the disclosure, the computer-executable instructions, when executed by a processor of an electronic device, configure the electronic device to obtain TSDF data of a voxel structure, based on depth data about the image obtained through the camera and the at least one piece of location information.

According to an embodiment of the disclosure, the computer-executable instructions, when executed by a processor of an electronic device, configure the electronic device to obtain color data and TSDF data about at least one voxel within a truncation distance, based on the color data of the voxel structure and the TSDF data of the voxel structure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 illustrates TSDF data according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
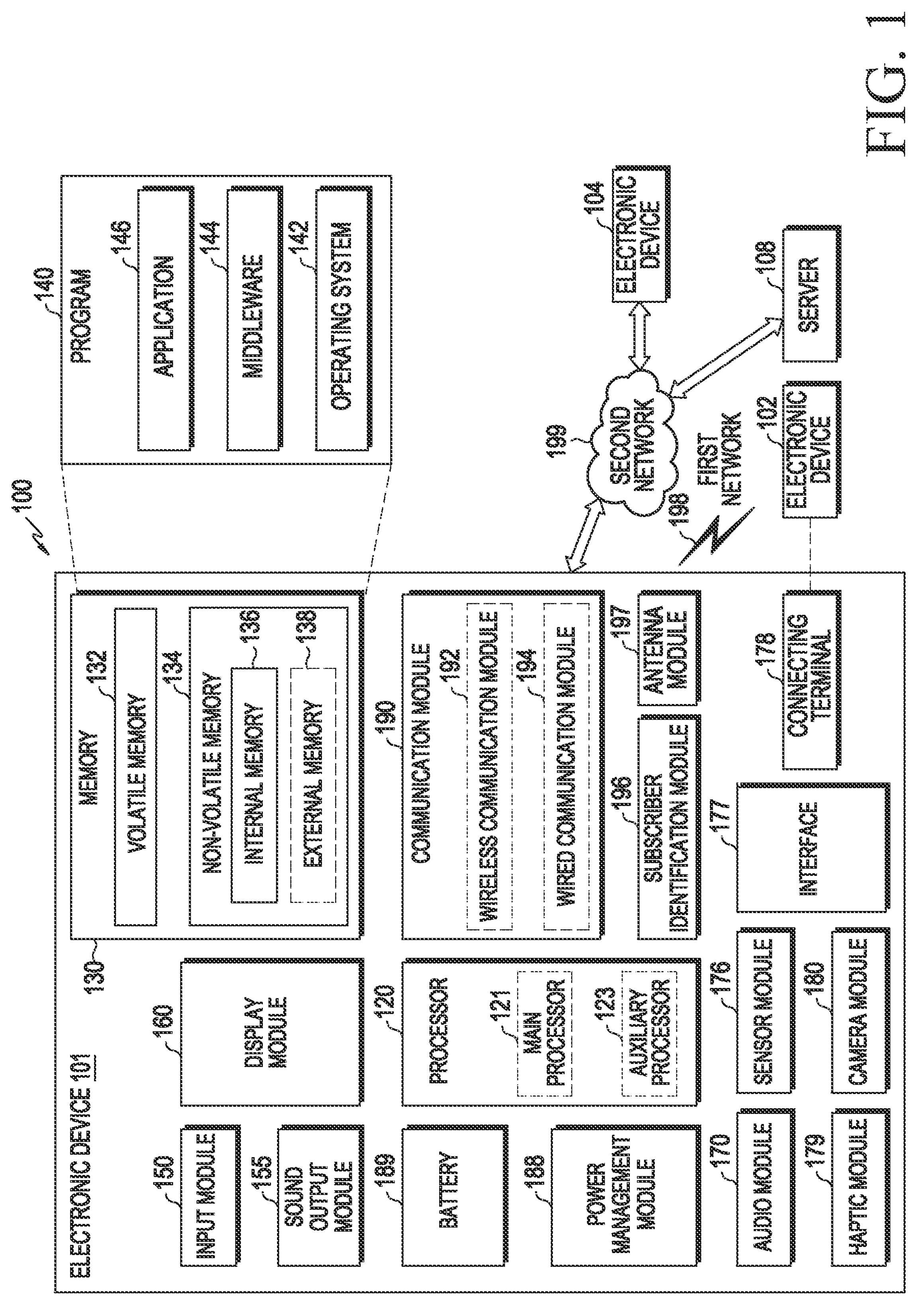
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, Wi-Fi direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter-wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of Ims or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to embodiments of the disclosure, the antenna module 197 may form a mm Wave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
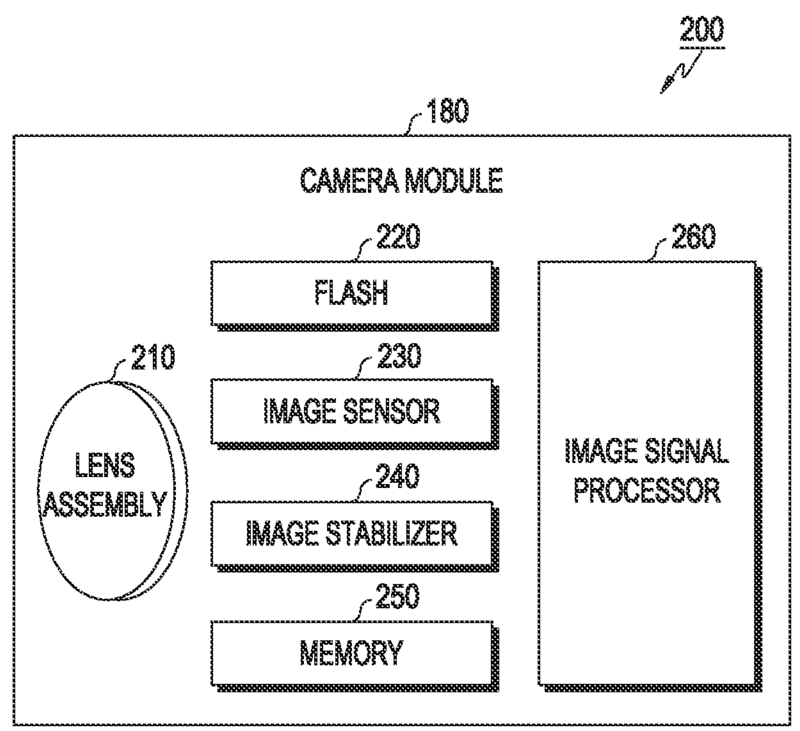
FIG. 2 is a block diagram illustrating a camera module according to an embodiment of the disclosure.

FIG. 2 is a block diagram 200 illustrating a camera module according to an embodiment of the disclosure.

Referring to FIG. 2, a camera module 280 may include a lens assembly 210, a flash 220, an image sensor 230, an image stabilizer 240, memory 250 (e.g., a buffer memory), or an image signal processor 260. The lens assembly 210 may collect light emitted or reflected from an object whose image is to be taken. The lens assembly 210 may include one or more lenses. According to an embodiment of the disclosure, the camera module 280 may include a plurality of lens assemblies 210. In such a case, the camera module 280 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment of the disclosure, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment of the disclosure, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 280 or the electronic device 201 including the camera module 280. This allows compensating for at least part of a negative effect (e.g., image blurring) by the movement on an image being captured. According to an embodiment of the disclosure, the image stabilizer 240 may sense such a movement by the camera module 280 or the electronic device 201 using a gyro sensor (not shown) or an acceleration sensor (not shown) disposed inside or outside the camera module 280. According to an embodiment of the disclosure, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 260. Thereafter, if a specified condition is met (e.g., by a user's input or system command), at least part of the raw image stored in the memory 250 may be obtained and processed, for example, by the image signal processor 260. According to an embodiment of the disclosure, the memory 250 may be configured as at least part of the memory 250 or as separate memory that is operated independently from the memory 250.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 280. An image processed by the image signal processor 260 may be stored back in the memory 250 for further processing, or may be provided to an external component (e.g., the memory 250, the display device 260, the electronic device 202, the electronic device 204, or the server 208) outside the camera module 280. According to an embodiment of the disclosure, the image signal processor 260 may be configured as at least part of the processor, or as a separate processor that is operated independently from the processor. If the image signal processor 260 is configured as a separate processor from the processor, at least one image processed by the image signal processor 260 may be displayed, by the processor, via the display device 260 as it is or after being further processed.

According to an embodiment of the disclosure, the electronic device 201 may include a plurality of camera modules 280 having different attributes or functions. In such a case, at least one of the plurality of camera modules 280 may form, for example, a wide-angle camera and at least another of the plurality of camera modules 280 may form a telephoto camera. Similarly, at least one of the plurality of camera modules 280 may form, for example, a front camera and at least another of the plurality of camera modules 280 may form a rear camera.

Figure 3:
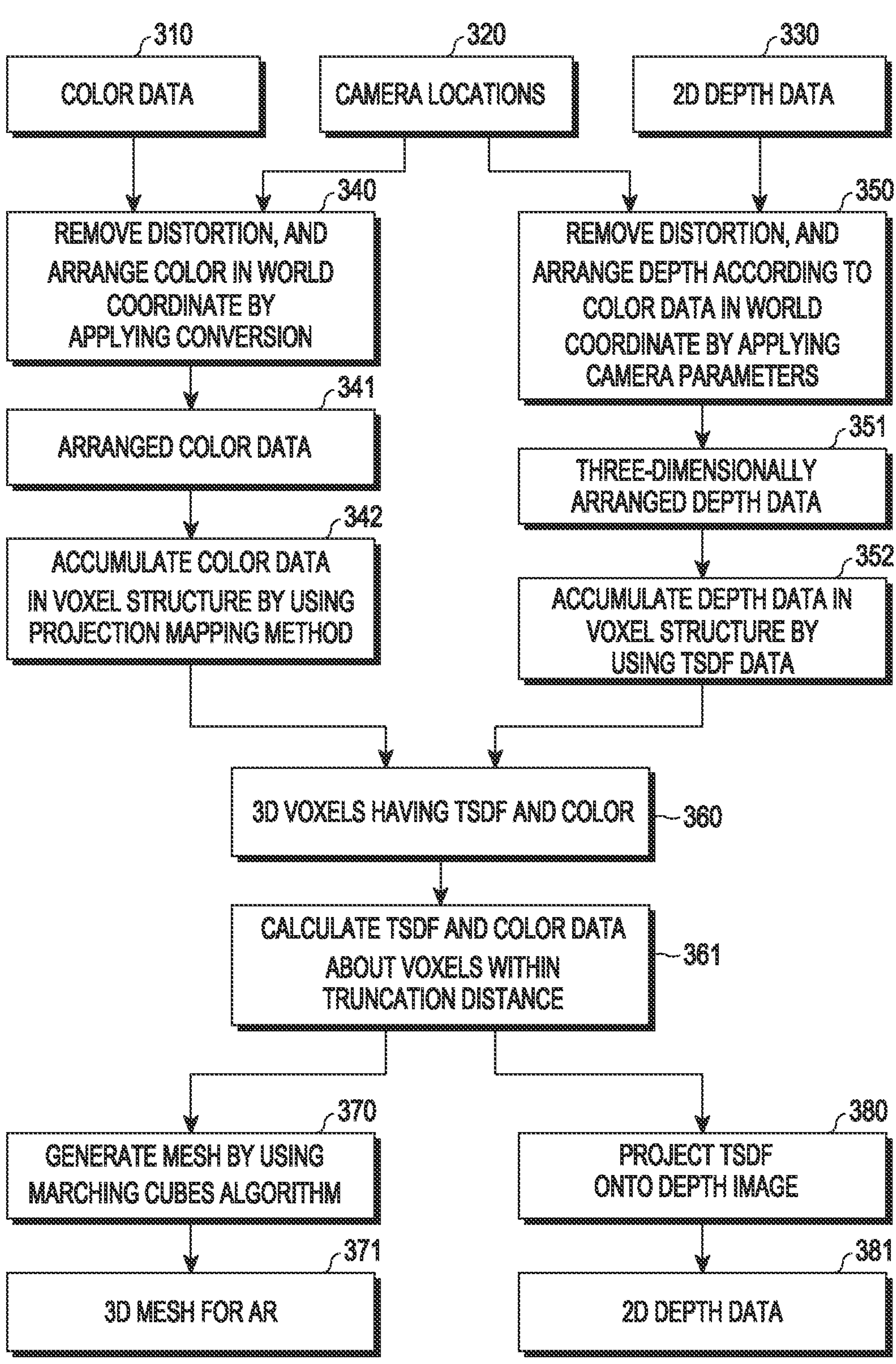
FIG. 3 illustrates an operation of an electronic device obtaining color data and depth data of an image, based on a voxel structure according to an embodiment of the disclosure.

FIG. 3 illustrates an operation of an electronic device obtaining color data and depth data of an image, based on a voxel structure according to an embodiment of the disclosure.

Referring to FIG. 3, according to an embodiment of the disclosure, in operation 340, an electronic device (e.g., the electronic device 101 of FIG. 1, the processor 120 of FIG. 1, or the camera module 180 of FIG. 2) may remove a distortion of an image, based on color data 310 about the image obtained through a camera (e.g., the camera module 180 of FIG. 1) and camera locations 320, and may arrange a color in a world coordinate (e.g., XYZ coordinates) by applying conversion (e.g., conversion of raw data into RGB data).

According to an embodiment of the disclosure, the distortion of the image may be incurred based on the type of the camera (e.g., the type of a lens).

According to an embodiment of the disclosure, in operation 342, the electronic device may accumulate color data in a voxel structure, based on arranged color data 341, by using a projection mapping method. According to an embodiment of the disclosure, a projection mapping operation will be described in detail with reference to FIG. 6. According to an embodiment of the disclosure, a voxel is a compound word of volume and pixel, and is a value of a regular grid unit in a 3D space, corresponding to a pixel in two-dimensional (2D).

According to an embodiment of the disclosure, since truncation is not applied in an operation of obtaining color data in a voxel structure, color data may be mapped to all voxels. According to an embodiment of the disclosure, truncation will be described in detail with reference to FIG. 7.

According to an embodiment of the disclosure, in operation 350, the electronic device may remove a distortion, based on the camera locations 320 and 2D depth data 330 obtained through a camera, and may arrange a depth according to the color data in the world coordinate by applying a camera parameter. According to an embodiment of the disclosure, the camera may be a time-of-flight (ToF) camera.

According to an embodiment of the disclosure, the distortion of the image may be incurred based on the type of the camera (e.g., the type of a lens).

According to an embodiment of the disclosure, the camera configured to obtain the color data about the image and the camera configured to obtain the depth data may be separate devices, but may also be a single device.

According to an embodiment of the disclosure, in operation 352, the electronic device may accumulate depth data in a voxel structure, based on the three-dimensionally arranged depth data 351, by using truncated signed distance field (TSDF) data. According to an embodiment of the disclosure, the electronic device may map the depth data to the same structure as the voxel structure to which the color data is mapped. Accordingly, an operation of the electronic device three-dimensionally projecting the 2D depth data and then projecting the same back onto a 2D color camera plane may be omitted. According to an embodiment of the disclosure, the TSDF data will be described in more detail with reference to FIG. 7.

According to an embodiment of the disclosure, in operation 361, the electronic device may calculate TSDF and color data about voxels within a truncation distance, based on 3D voxels 360 having the TSDF data and the color data.

According to an embodiment of the disclosure, in operation 370, the electronic device may generate a mesh by using a marching cubes algorithm, and may output a 3D mesh 371 for augmented reality (AR).

According to an embodiment of the disclosure, in operation 380, the electronic device may project a TSDF onto a depth image, and may output 2D depth data 381.

Figure 4:
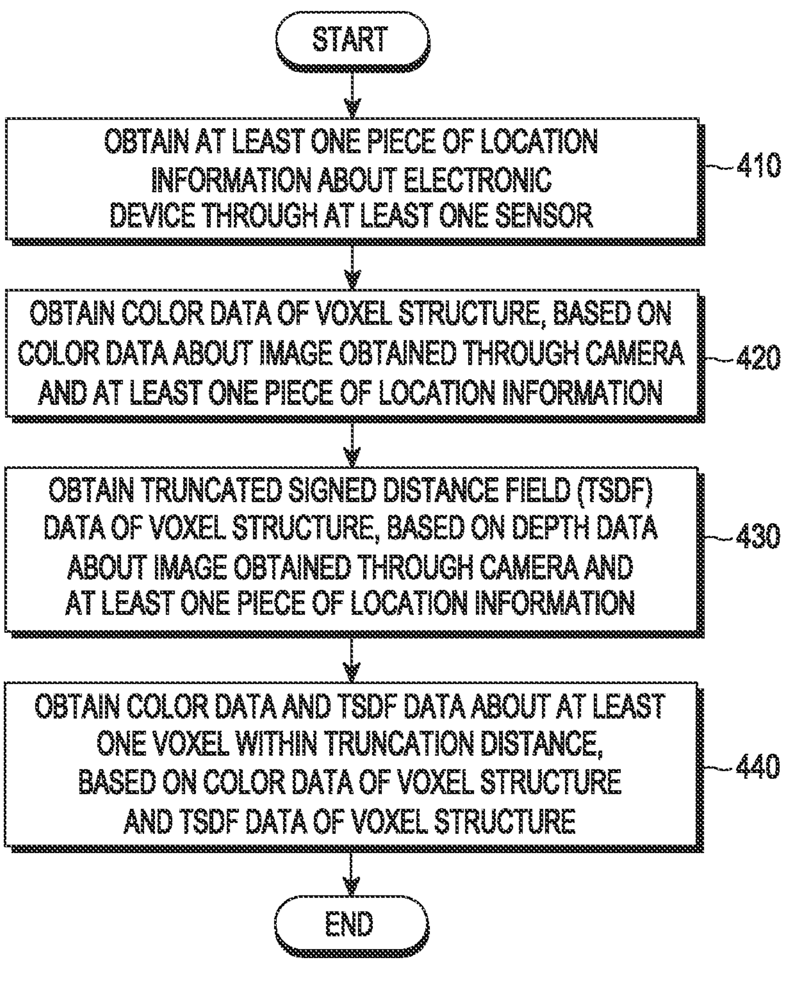
FIG. 4 is a flowchart illustrating an operation of an electronic device obtaining color data and depth data of an image, based on a voxel structure according to an embodiment of the disclosure.

FIG. 4 is a flowchart illustrating an operation of an electronic device obtaining color data and depth data of an image, based on a voxel structure according to an embodiment of the disclosure.

Referring to FIG. 4, according to an embodiment of the disclosure, in operation 410, an electronic device (e.g., the electronic device 101 of FIG. 1, the processor 120 of FIG. 1, or the camera module 180 of FIG. 2) may obtain at least one piece of location information about the electronic device through at least one sensor (e.g., the sensor module 176 of 1). For example, the electronic device may obtain location information about the electronic device (e.g., a camera (e.g., the camera module 180 of FIG. 1)) through a global positioning system (GPS) sensor, an acceleration sensor, and/or a gyro sensor, and may obtain location information about the electronic device by further using movement information about the electronic device. According to an embodiment of the disclosure, the location information about the electronic device may have the same configuration as the camera locations 320 of FIG. 3.

According to an embodiment of the disclosure, in operation 420, the electronic device may obtain color data of a voxel structure, based on color data about an image obtained through a camera and the at least one piece of location information.

According to an embodiment of the disclosure, the electronic device may obtain the color data of the voxel structure by each frame of the image obtained through the camera. According to an embodiment of the disclosure, the operation of obtaining the color data may be the same operation as operation 342 of FIG. 3.

According to an embodiment of the disclosure, the electronic device may obtain a frustum corresponding to a visual field of the camera. According to an embodiment of the disclosure, the frustum defines the visual field of the camera, and may be a shape formed by cutting a top portion of a quadrangular pyramid on which the camera is disposed on a vertex. According to an embodiment of the disclosure, the frustum may include six planes. For example, the frustum may include a near plane, which is a plane perpendicular to the camera and representing a closest visual field, a far plane, which is a plane perpendicular to the camera and representing a farthest visual field, a left plane, which is a plane representing a left visual field of the camera, a right plane, which is a plane representing a right visual field of the camera, a top plane, which is a plane representing an upper visual field of the camera, and a bottom plane, which is a plane representing a lower visual field of the camera.

According to an embodiment of the disclosure, the electronic device may obtain a plurality of projection mapping areas respectively for a plurality of voxels included in the frustum on a far plane of the frustum.

According to an embodiment of the disclosure, a color value and a standard deviation for each of the plurality of projection mapping areas may be obtained as the color data of the voxel structure. According to an embodiment of the disclosure, the electronic device may obtain the color value (e.g., $\Gamma_\tau(v_c)$) and the standard deviation for each of the plurality of projection mapping areas respectively for the plurality of voxels included in the frustum, based on a weight (e.g., $W_{\Gamma_\tau}(v_c)$) proportional to a distance to the electronic device.

According to an embodiment of the disclosure, a projection mapping operation will be described in detail with reference to FIG. 6.

According to an embodiment of the disclosure, the electronic device may calculate a color value $\Gamma(v)$ of each voxel without using depth data. According to an embodiment of the disclosure, a weight $W\_\Gamma$ (v) and a standard deviation $\sigma\_\Gamma$ (v) may be calculated together. According to an embodiment of the disclosure, the electronic device may repeatedly update color values, weights, and/or standard deviations of all voxels obtained for each frame of the image.

According to an embodiment of the disclosure, in operation 430, the electronic device may obtain truncated signed distance field (TSDF) data of a voxel structure, based on depth data about the image obtained through the camera and the at least one piece of location information.

According to an embodiment of the disclosure, the electronic device may obtain a TSDF value (e.g., $\phi_\tau(v_c)$) of each of the plurality of voxels included in the frustum, based on a weight (e.g., $W(v_c)$) proportional to the distance to the electronic device.

According to an embodiment of the disclosure, an operation of obtaining the TSDF value will be described in more detail with reference to FIG. 7.

According to an embodiment of the disclosure, the electronic device may remove a distortion of the depth data about the image, based on the type of the camera and/or the at least one piece of location information, may arrange the depth data from which the distortion has been removed, based on a coordinate system (e.g., a world coordinate system (e.g., a XYZ coordinate system)), and may then obtain depth data of a voxel structure.

According to an embodiment of the disclosure, the electronic device may identify at least one undefined voxel among the plurality of voxels included in the frustum. According to an embodiment of the disclosure, the electronic device may obtain TSDF data about at least one undefined voxel, based on trilinear interpolation.

According to an embodiment of the disclosure, a weight (e.g., $W(v_u)$) of the undefined voxel may be configured to 0.

According to an embodiment of the disclosure, in operation 440, the electronic device may obtain color data and TSDF data about at least one voxel within a truncation distance, based on the color data of the voxel structure and the TSDF data of the voxel structure.

According to an embodiment of the disclosure, the electronic device may identify the at least one voxel within the truncation distance among the plurality of voxels included in the frustum. According to an embodiment of the disclosure, the at least one voxel within the truncation distance may have a TSDF data value greater than −1 and less than 1. According to an embodiment of the disclosure, a surface (e.g., a boundary) of an object may be included in the truncation distance, voxels having a TSDF value of −1 may refer to an area inside the object based on the surface of the object, and voxels having a TSDF value of 1 may refer to an area outside the object based on the surface of the object. According to an embodiment of the disclosure, the TSDF value and the truncation distance will be described below with reference to FIG. 7.

According to an embodiment of the disclosure, the electronic device may update the color data and the TSDF data about the at least one voxel, based on color data and TSDF data about voxels adjacent to the at least one voxel.

According to an embodiment of the disclosure, the electronic device may generate a 3D mesh, based on a marching cubes algorithm. According to an embodiment of the disclosure, the marching cubes algorithm is a method of visualizing location information having the same density value as a value given as a contour level in a 3D density map as a curved surface.

According to an embodiment of the disclosure, the electronic device may update the depth data about the image, based on the TSDF data about the at least one voxel within the truncation distance.

Figure 5:
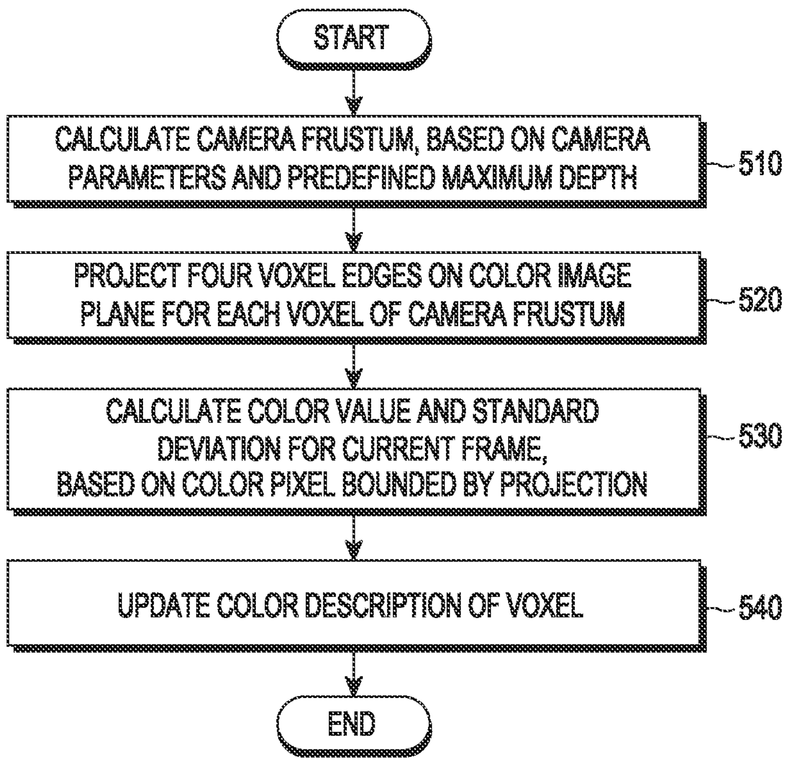
FIG. 5 is a flowchart illustrating an operation of an electronic device obtaining color data through a voxel structure according to an embodiment of the disclosure.

FIG. 5 is a flowchart illustrating an operation of an electronic device obtaining color data through a voxel structure according to an embodiment of the disclosure.

Referring to FIG. 5, in operation 510, an electronic device (e.g., the electronic device 101 of FIG. 1, the processor 120 of FIG. 1, or the camera module 180 of FIG. 2) may calculate a camera frustum, based on parameters of a camera (e.g., the camera of FIG. 1 or the camera module 180 of FIG. 2) and a predefined maximum depth.

According to an embodiment of the disclosure, the frustum defines a visual field of the camera, and may be a shape formed by cutting a top portion of a quadrangular pyramid on which the camera is disposed on a vertex. According to an embodiment of the disclosure, the electronic device may obtain the frustum including a far plane, which is a plane at a maximum distance from the camera, based on the maximum depth.

According to an embodiment of the disclosure, in operation 520, the electronic device may project four voxel edges on a color image plane for each voxel of the camera frustum. According to an embodiment of the disclosure, the camera frustum may include a plurality of voxels, and four edges of each voxel may be projected onto a color image plane corresponding to the far plane of the frustum. According to an embodiment of the disclosure, the electronic device may project four vertices included in the voxel.

According to an embodiment of the disclosure, in operation 530, the electronic device may calculate a color value and a standard deviation for a current frame, based on a color pixel bounded by projection.

According to an embodiment of the disclosure, the electronic device may calculate a color value $\Gamma(v)$ for a voxel v included in the current frame, based on a color pixel of a projection area formed by projecting four edges of one voxel onto a color image plane. According to an embodiment of the disclosure, a weight $W_\Gamma(v)$ and a standard deviation $\sigma_\Gamma(v)$ may be calculated together. According to an embodiment of the disclosure, the electronic device may repeatedly update a color value, weight, and/or standard deviation of all voxels obtained for each frame of an image.

According to an embodiment of the disclosure, the electronic device may update a color description of a voxel, based on a weighted average of a past measurement value and a current measurement value as shown below in Equations 1 to 3.

$$\Gamma(v) \leftarrow \frac{W_\Gamma(v)\Gamma(v) + \alpha(v)\Gamma_p(v)}{W_\Gamma(v) + \alpha(v)} \quad \text{Equation 1}$$

$$\sigma_\Gamma(v) \leftarrow \frac{W_\Gamma(v)\sigma_\Gamma(v) + \alpha(v)\sigma_{\Gamma_p}(v)}{W_\Gamma(v) + \alpha(v)} \quad \text{Equation 2}$$

$$W_\Gamma(v) \leftarrow W_\Gamma(v) + \alpha(v) \quad \text{Equation 3}$$

Here, $\Gamma(v)$ is the color value of the voxel v, $\sigma_\Gamma(v)$ is the standard deviation of the voxel v, and $W_\Gamma(v)$ is the weight of the voxel v.

According to an embodiment of the disclosure, a voxel color update weighting function $\alpha(v)$ may be for compensating for a size of a projection area corresponding to the voxel v. For example, since a voxel closer to the camera generates a larger bounding box and includes more variable data, the voxel closer to the camera may be weighted to be less important.

According to an embodiment of the disclosure, in operation 540, the electronic device may update the color description of the voxel. For example, the electronic device may update a color description (e.g., $\Gamma(v)$, $\sigma_\Gamma(v)$, and $W_\Gamma(v)$) of the voxel v.

Figure 6:
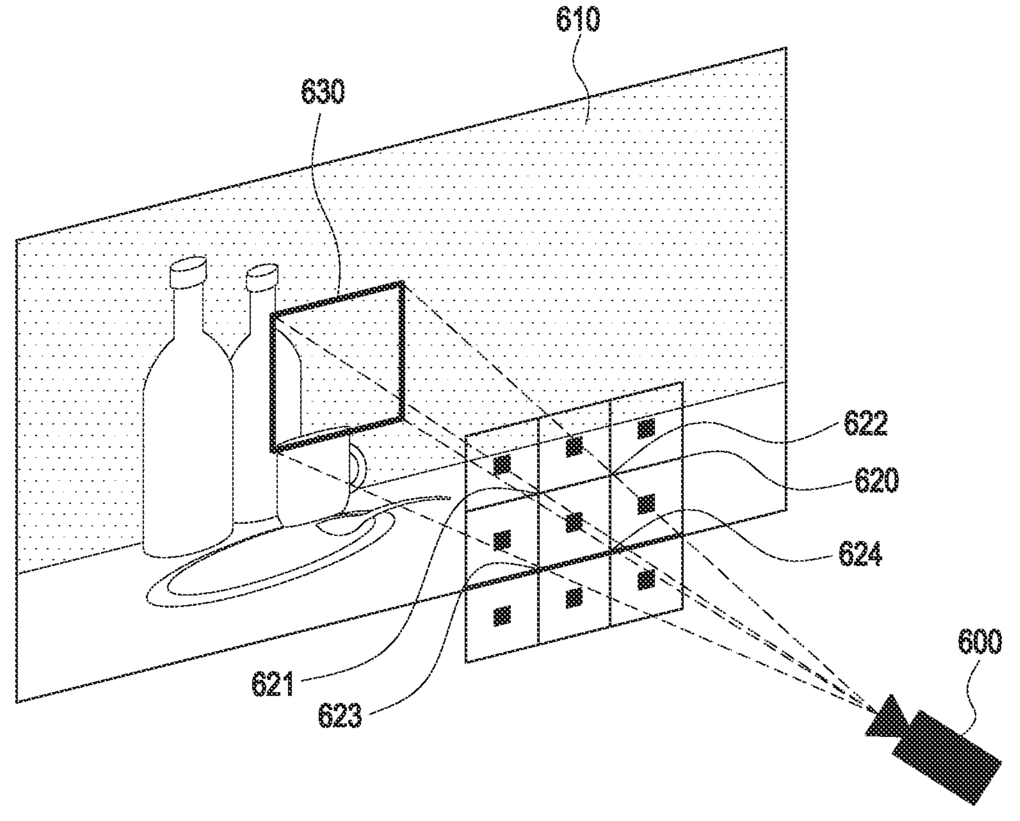
FIG. 6 illustrates a projection mapping operation of an electronic device according to an embodiment of the disclosure.

FIG. 6 illustrates a projection mapping operation of an electronic device according to an embodiment of the disclosure.

Referring to FIG. 6, an electronic device 600 (e.g., the electronic device 101 of FIG. 1, the processor 120 of FIG. 1, or the camera module 180 of FIG. 2) may perform a projection mapping operation of each of a plurality of voxels included in a voxel grid 620 onto a color image plane 610 (e.g., a far plane of a camera frustum).

According to an embodiment of the disclosure, when a projection mapping operation is performed on a first voxel at a center of the voxel grid 620, camera rays emitted from the electronic device may project four edges of the first voxel onto the color image plane 610. According to an embodiment of the disclosure, the four edges of the first voxel may be farthest from a camera origin among edges of the first voxel. According to an embodiment of the disclosure, the four edges of the first voxel may be obtained by connecting two adjacent vertices among four vertices 621, 622, 623, and 624 of the first voxel.

According to an embodiment of the disclosure, the electronic device may calculate a color value and a standard deviation for a current frame, based on a projection area 630 (e.g., a color pixel) bounded on the color image plane 610 by projection.

FIG. 7 illustrates TSDF data according to an embodiment of the disclosure.

Referring to FIG. 7, an electronic device (e.g., the electronic device 101 of FIG. 1, the processor 120 of FIG. 1, or the camera module 180 of FIG. 2) may obtain 3D vertices in a world coordinate system by using a six degrees of freedom (DOF) camera pose matrix, and may then obtain TSDF data about each voxel.

According to an embodiment of the disclosure, the electronic device may obtain TSDF data about each of a plurality of voxels 710, and TSDF data of 0 may refer to a surface 740 of an object. According to an embodiment of the disclosure, a TSDF value of −1 may refer to an area 729 inside the object based on the surface 740 of the object, and when a TSDF value of 1 may refer to an area 730 outside the object based on the surface 740 of the object.

According to an embodiment of the disclosure, the electronic device may truncate a voxel having a TSDF value of −1 or greater and less than 1, and the length of a voxel including the surface 740 of the object having a TSDF value of 0 and having a TSDF value of −1 or greater and less than 1 may be a truncation distance 750.

Figure 8:
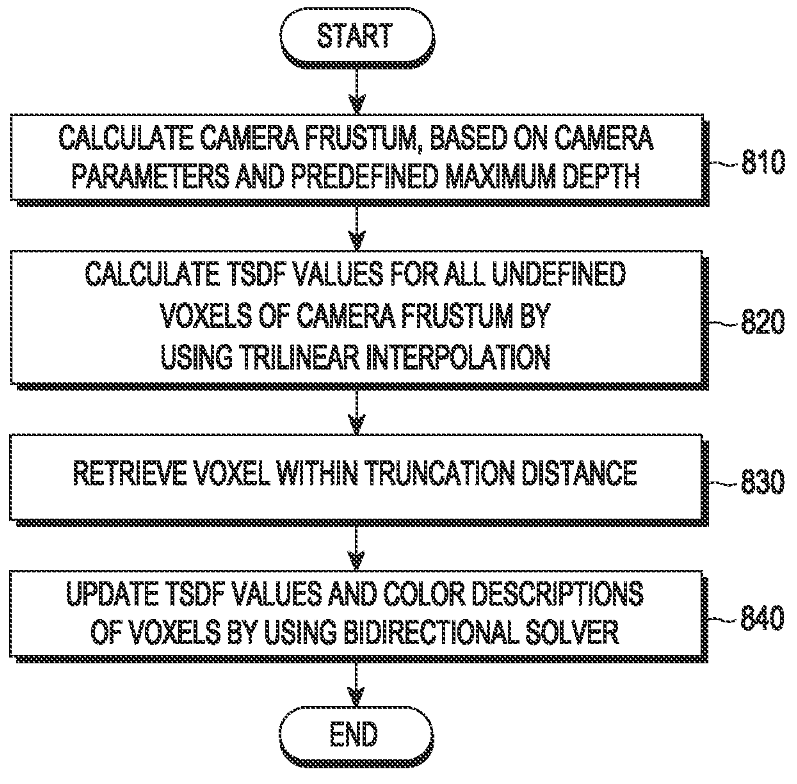
FIG. 8 is a flowchart illustrating an operation of an electronic device updating color data and depth data about a voxel within a truncation distance according to an embodiment of the disclosure.

FIG. 8 is a flowchart illustrating an operation of an electronic device updating color data and depth data about a voxel within a truncation distance according to an embodiment of the disclosure.

Referring to FIG. 8, in operation 810, an electronic device (e.g., the electronic device 101 of FIG. 1, the processor 120 of FIG. 1, or the camera module 180 of FIG. 2) may calculate a camera frustum, based on camera parameters and a predefined maximum depth.

According to an embodiment of the disclosure, the frustum defines a visual field of a camera, and may be a shape formed by cutting a top portion of a quadrangular pyramid on which the camera is disposed on a vertex. According to an embodiment of the disclosure, the electronic device may obtain the frustum including a far plane, which is a plane at a maximum distance from the camera, based on the maximum depth.

According to an embodiment of the disclosure, in operation 820, the electronic device may calculate TSDF values for all undefined voxels of the camera frustum by using trilinear interpolation.

According to an embodiment of the disclosure, the electronic device may calculate the TSDF values for the undefined voxels, based on TSDF values of adjacent voxels in three directions (e.g., x, y, and z directions) with respect to each of the undefined voxels. According to an embodiment of the disclosure, the electronic device may configure a weight (e.g., $(v_u)$) for the undefined voxels to 0.

According to an embodiment of the disclosure, in operation 830, the electronic device may retrieve a voxel within a truncation distance.

According to an embodiment of the disclosure, the electronic device may identify a voxel including a surface of an object, based on TSDF data about a plurality of voxels. For example, the electronic device may identify voxels having a TSDF value greater than −1 and less than 1.

According to an embodiment of the disclosure, in operation 840, the electronic device may update TSDF values and color descriptions of the voxels by using a bidirectional solver.

According to an embodiment of the disclosure, the electronic device may update TSDF values $\Phi(v_i)$ and color values $\Gamma(v_i)$ of the voxels by using Equation 4, which is a bidirectional solver.

According to an embodiment of the disclosure, the bidirectional solver is for reconstructing an output signal $(v_i)$, based on an input signal $\Phi(v_i)$ partly available. According to an embodiment of the disclosure, optimized $\Phi(v_i)$ may include an image-dependent smoothness term to bidirectionally smooth the output signal (e.g. smoothness between $v_i$ and $v_j$ which are adjacent) and a data fidelity term to minimize the square of a residual between an input and an output weighted by a reliability (e.g., $W(v_i)$) term.

Equation 4

$$\text{Optimized } \underset{\phi}{\Phi}(v_i) = \min \frac{\lambda}{2} \sum_{i,j} \hat{A_{i,j}} (\phi(v_i) - \phi(v_j))^2 + \sum_i W(v_i)(\phi(v_i) - \Phi(v_i))^2$$

According to an embodiment of the disclosure, λ is a regularization parameter that controls the TSDF continuity between neighboring voxels and adjusts the contribution of the smoothness term, and the smoothness term may be obtained by Equation 5, which is a bistochastic version of a bidirectional preference matrix $A_{i,j}$ using color information as a guide.

Equation 5

$$A_{i,j} = \exp\left(-\frac{(\Phi(v_i) - \Phi(v_j))^2}{2\kappa^2} - \frac{(\Gamma(v_i) - \Gamma(v_j))^2}{2\sigma_\Gamma^2(v_i)\sigma_\Gamma^2(v_j)}\right)$$

The disclosure does not require prior learning, reduces an effect of occlusion that may cause an artifact in depth data about a foreground and a background, and averages small inaccuracies by using TSDF data, making it possible to obtain more accurate depth data while reducing resource consumption.

According to an embodiment of the disclosure, an electronic device may include a camera, at least one sensor, memory, and at least one processor configured to be operatively connected to the camera, the at least one sensor, and the memory.

According to an embodiment of the disclosure, the at least one processor may obtain at least one piece of location information about the electronic device through the at least one sensor.

According to an embodiment of the disclosure, the at least one processor may obtain color data of a voxel structure, based on color data about an image obtained through the camera and the at least one piece of location information.

According to an embodiment of the disclosure, the at least one processor may obtain truncated signed distance field (TSDF) data of a voxel structure, based on depth data about the image obtained through the camera and the at least one piece of location information.

According to an embodiment of the disclosure, the at least one processor may obtain color data and TSDF data about at least one voxel within a truncation distance, based on the color data of the voxel structure and the TSDF data of the voxel structure.

According to an embodiment of the disclosure, the at least one processor may obtain the color data of the voxel structure, based on a projection mapping method.

According to an embodiment of the disclosure, the at least one processor may obtain a frustum corresponding to a visual field of the camera.

According to an embodiment of the disclosure, the at least one processor may obtain a plurality of projection mapping areas respectively for a plurality of voxels included in the frustum on a far plane of the frustum.

According to an embodiment of the disclosure, the at least one processor may obtain a color value and a standard deviation for each of the plurality of projection mapping areas as the color data of the voxel structure.

According to an embodiment of the disclosure, the at least one processor may obtain the color value and the standard deviation for each of the plurality of projection mapping areas for each of the plurality of voxels included in the frustum, based on a weight proportional to a distance to the electronic device.

According to an embodiment of the disclosure, the at least one processor may identify at least one undefined voxel among the plurality of voxels included in the frustum.

According to an embodiment of the disclosure, the at least one processor may obtain TSDF data about the at least one undefined voxel, based on trilinear interpolation.

According to an embodiment of the disclosure, the at least one processor may identify the at least one voxel within the truncation distance among the plurality of voxels included in the frustum.

According to an embodiment of the disclosure, the at least one processor may update the color data and the TSDF data about the at least one voxel, based on color data and TSDF data about voxels adjacent to the at least one voxel.

According to an embodiment of the disclosure, the at least one processor may obtain the color data of the voxel structure after removing a distortion of the color data about the image, based on a type of the camera and/or the at least one piece of location information, and arranging the color data from which the distortion has been removed, based on a coordinate system of a space.

According to an embodiment of the disclosure, the at least one processor may obtain the depth data of the voxel structure after removing a distortion of the depth data about the image, based on a type of the camera and/or the at least one piece of location information, and arranging the depth data from which the distortion has been removed, based on a coordinate system of a space.

According to an embodiment of the disclosure, the at least one processor may generate a 3D mesh, based on a marching cubes algorithm.

According to an embodiment of the disclosure, the at least one processor may update the depth data about the image, based on the TSDF data about the at least one voxel within the truncation distance.

According to an embodiment of the disclosure, a method for controlling an electronic device may include obtaining at least one piece of location information about the electronic device through at least one sensor.

According to an embodiment of the disclosure, the method for controlling the electronic device may include obtaining color data of a voxel structure, based on color data about an image obtained through a camera and the at least one piece of location information.

According to an embodiment of the disclosure, the method for controlling the electronic device may include obtaining truncated signed distance field (TSDF) data of a voxel structure, based on depth data about the image obtained through the camera and the at least one piece of location information.

According to an embodiment of the disclosure, the method for controlling the electronic device may include obtaining color data and TSDF data about at least one voxel within a truncation distance, based on the color data of the voxel structure and the TSDF data of the voxel structure.

According to an embodiment of the disclosure, the obtaining of the color data of the voxel structure may include obtaining the color data of the voxel structure, based on a projection mapping method.

According to an embodiment of the disclosure, the obtaining of the color data of the voxel structure may include obtaining a frustum corresponding to a visual field of the camera.

According to an embodiment of the disclosure, the obtaining of the color data of the voxel structure may include obtaining a plurality of projection mapping areas respectively for a plurality of voxels included in the frustum on a far plane of the frustum.

According to an embodiment of the disclosure, the obtaining of the color data of the voxel structure may include obtaining a color value and a standard deviation for each of the plurality of projection mapping areas as the color data of the voxel structure.

According to an embodiment of the disclosure, the obtaining of the color data of the voxel structure may include obtaining the color value and the standard deviation for each of the plurality of projection mapping areas for each of the plurality of voxels included in the frustum, based on a weight proportional to a distance to the electronic device.

According to an embodiment of the disclosure, the obtaining of the TSDF data of the voxel structure may include identifying at least one undefined voxel among the plurality of voxels included in the frustum.

According to an embodiment of the disclosure, the obtaining of the TSDF data of the voxel structure may include obtaining TSDF data about the at least one undefined voxel, based on trilinear interpolation.

According to an embodiment of the disclosure, the obtaining of the color data and the TSDF data about the at least one voxel within the truncation distance may include identifying the at least one voxel within the truncation distance among the plurality of voxels included in the frustum.

According to an embodiment of the disclosure, the obtaining of the color data and the TSDF data about the at least one voxel within the truncation distance may include updating the color data and the TSDF data about the at least one voxel, based on color data and TSDF data about voxels adjacent to the at least one voxel.

According to an embodiment of the disclosure, the method for controlling the electronic device may further include obtaining the color data of the voxel structure after removing a distortion of the color data about the image, based on a type of the camera and/or the at least one piece of location information, and arranging the color data from which the distortion has been removed, based on a coordinate system of a space.

According to an embodiment of the disclosure, the method for controlling the electronic device may further include obtaining the depth data of the voxel structure after removing a distortion of the depth data about the image, based on a type of the camera and/or the at least one piece of location information, and arranging the depth data from which the distortion has been removed, based on a coordinate system of a space.

According to an embodiment of the disclosure, the method for controlling the electronic device may further include generating a 3D mesh, based on a marching cubes algorithm.

According to an embodiment of the disclosure, the method for controlling the electronic device may further include updating the depth data about the image, based on the TSDF data about the at least one voxel within the truncation distance.

According to an embodiment of the disclosure, a non-transitory computer-readable recording medium may store one or more programs, and the one or more programs may include instructions which cause a processor to obtain at least one piece of location information about an electronic device through at least one sensor.

According to an embodiment of the disclosure, the one or more programs may include instructions which cause the processor to obtain color data of a voxel structure, based on color data about an image obtained through the camera and the at least one piece of location information.

According to an embodiment of the disclosure, the one or more programs may include instructions which cause the processor to obtain truncated signed distance field (TSDF) data of a voxel structure, based on depth data about the image obtained through the camera and the at least one piece of location information.

According to an embodiment of the disclosure, the one or more programs may include instructions which cause the processor to obtain color data and TSDF data about at least one voxel within a truncation distance, based on the color data of the voxel structure and the TSDF data of the voxel structure.

According to an embodiment of the disclosure, the one or more programs may include instructions which cause the processor to obtain the color data of the voxel structure, based on a projection mapping method.

According to an embodiment of the disclosure, the one or more programs may include instructions which cause the processor to obtain a frustum corresponding to a visual field of the camera.

According to an embodiment of the disclosure, the one or more programs may include instructions which cause the processor to obtain a plurality of projection mapping areas respectively for a plurality of voxels included in the frustum on a far plane of the frustum.

According to an embodiment of the disclosure, the one or more programs may include instructions which cause the processor to obtain a color value and a standard deviation for each of the plurality of projection mapping areas as the color data of the voxel structure.

According to an embodiment of the disclosure, the one or more programs may include instructions which cause the processor to obtain the color value and the standard deviation for each of the plurality of projection mapping areas for each of the plurality of voxels included in the frustum, based on a weight proportional to a distance to the electronic device.

According to an embodiment of the disclosure, the one or more programs may include instructions which cause the processor to identify at least one undefined voxel among the plurality of voxels included in the frustum.

According to an embodiment of the disclosure, the one or more programs may include instructions which cause the processor to obtain TSDF data about the at least one undefined voxel, based on trilinear interpolation.

According to an embodiment of the disclosure, the one or more programs may include instructions which cause the processor to identify the at least one voxel within the truncation distance among the plurality of voxels included in the frustum.

According to an embodiment of the disclosure, the one or more programs may include instructions which cause the processor to update the color data and the TSDF data about the at least one voxel, based on color data and TSDF data about voxels adjacent to the at least one voxel.

According to an embodiment of the disclosure, the one or more programs may include instructions which cause the processor to obtain the color data of the voxel structure after removing a distortion of the color data about the image, based on a type of the camera and/or the at least one piece of location information, and arranging the color data from which the distortion has been removed, based on a coordinate system of a space.

According to an embodiment of the disclosure, the one or more programs may include instructions which cause the processor to obtain the depth data of the voxel structure after removing a distortion of the depth data about the image, based on a type of the camera and/or the at least one piece of location information, and arranging the depth data from which the distortion has been removed, based on a coordinate system of a space.

According to an embodiment of the disclosure, the one or more programs may include instructions which cause the processor to generate a 3D mesh, based on a marching cubes algorithm.

According to an embodiment of the disclosure, the one or more programs may include instructions which cause the processor to update the depth data about the image, based on the TSDF data about the at least one voxel within the truncation distance.

The electronic device according to embodiment may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that embodiment of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to embodiments of the disclosure, each component (e.g., a module or a program) of the above-described components may include a single entity or multiple entities, and some of the multiple entities may be separately disposed in different components. According to embodiments of the disclosure, one or more of the above-described components may be omitted, or one or more other components may be added. Alternatively or additionally, a plurality of components (e.g., modules or programs) may be integrated into a single component. In such a case, according to embodiments of the disclosure, the integrated component may still perform one or more functions of each of the plurality of components in the same or similar manner as they are performed by a corresponding one of the plurality of components before the integration. According to embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a camera;

at least one sensor;

memory, comprising one or more storage media, storing instructions; and at least one processor communicatively coupled to the camera, the at least one sensor, and the memory, wherein the instructions, when executed by the at least one processor individually or collectively, cause the electronic device to:

obtain at least one piece of location information about the electronic device through the at least one sensor, obtain color data of a voxel structure, based on color data about an image obtained through the camera and the at least one piece of location information, obtain truncated signed distance field (TSDF) data of the voxel structure, after removing a distortion of depth data about the image obtained through the camera based on a type of the camera and the at least one piece of location information, and obtain color data and TSDF data about at least one voxel within a truncation distance, based on the color data of the voxel structure and the TSDF data of the voxel structure.

2. The electronic device of claim 1, wherein the instructions, when executed by the at least one processor individually or collectively further cause the electronic device to:

obtain the color data of the voxel structure, based on a projection mapping method.

3. The electronic device of claim 2, wherein the instructions, when executed by the at least one processor individually or collectively, further cause the electronic device to:

obtain a frustum corresponding to a visual field of the camera, obtain a plurality of projection mapping areas for a plurality of voxels included in the frustum, respectively, on a far plane of the frustum, and obtain a color value and a standard deviation for each of the plurality of projection mapping areas as the color data of the voxel structure.

4. The electronic device of claim 3, wherein the instructions, when executed by the at least one processor individually or collectively, further cause the electronic device to:

obtain the color value and the standard deviation for each of the plurality of projection mapping areas for the plurality of voxels included in the frustum, respectively, based on a weight proportional to a distance to the electronic device.

5. The electronic device of claim 4, wherein the instructions, when executed by the at least one processor individually or collectively, further cause the electronic device to:

identify at least one undefined voxel among a plurality of voxels included in the frustum, and obtain TSDF data about the at least one undefined voxel, based on trilinear interpolation.

6. The electronic device of claim 5, wherein the instructions, when executed by the at least one processor individually or collectively, further cause the electronic device to:

identify the at least one voxel within the truncation distance among the plurality of voxels included in the frustum, and update the color data and the TSDF data about the at least one voxel, based on color data and TSDF data about voxels adjacent to the at least one voxel.

7. The electronic device of claim 1, wherein the instructions, when executed by the at least one processor individually or collectively, further cause the electronic device to:

obtain the color data of the voxel structure after removing a distortion of the color data about the image, based on the type of the camera and/or the at least one piece of location information, and arranging the color data from which the distortion has been removed, based on a coordinate system of a space.

8. The electronic device of claim 1, wherein the instructions, when executed by the at least one processor individually or collectively, further cause the electronic device to:

obtain the depth data of the voxel structure after arranging the depth data from which the distortion has been removed, based on a coordinate system of a space.

9. The electronic device of claim 1, wherein the instructions, when executed by the at least one processor individually or collectively, further cause the electronic device to;

generate a three-dimensional (3D) mesh, based on a marching cubes algorithm.

10. The electronic device of claim 1, wherein the instructions, when executed by the at least one processor individually or collectively, further cause the electronic device to:

update the depth data about the image, based on the TSDF data about the at least one voxel within the truncation distance.

11. A method of controlling an electronic device, the method comprising:

obtaining at least one piece of location information about the electronic device through at least one sensor;

obtaining color data of a voxel structure, based on color data about an image obtained through a camera and the at least one piece of location information;

obtaining truncated signed distance field (TSDF) data of the voxel structure, after removing a distortion of depth data about the image obtained through the camera based on a type of the camera and the at least one piece of location information; and obtaining color data and TSDF data about at least one voxel within a truncation distance, based on the color data of the voxel structure and the TSDF data of the voxel structure.

12. The method of claim 11, wherein the obtaining of the color data of the voxel structure comprises obtaining the color data of the voxel structure, based on a projection mapping method.

13. The method of claim 12, wherein the obtaining of the color data of the voxel structure comprises:

obtaining a frustum corresponding to a visual field of the camera;

obtaining a plurality of projection mapping areas for a plurality of voxels included in the frustum, respectively, on a far plane of the frustum; and obtaining a color value and a standard deviation for each of the plurality of projection mapping areas as the color data of the voxel structure.

14. The method of claim 13, wherein the obtaining of the color data of the voxel structure comprises obtaining the color value and the standard deviation for the plurality of projection mapping areas for each of the plurality of voxels included in the frustum, respectively, based on a weight proportional to a distance to the electronic device.

15. The method of claim 14, wherein the obtaining of the TSDF data of the voxel structure comprises:

identifying at least one undefined voxel among a plurality of voxels included in the frustum; and obtaining TSDF data about the at least one undefined voxel, based on trilinear interpolation.

16. The method of claim 15, wherein the obtaining of the color data and the TSDF data about the at least one voxel within the truncation distance comprises:

identifying the at least one voxel within the truncation distance among the plurality of voxels included in the frustum; and updating the color data and the TSDF data about the at least one voxel, based on color data and TSDF data about voxels adjacent to the at least one voxel.

17. The method of claim 11, further comprising:

obtaining the color data of the voxel structure after removing a distortion of the color data about the image, based on the type of the camera and/or the at least one piece of location information, and arranging the color data from which the distortion has been removed, based on a coordinate system of a space.

18. The method of claim 11, further comprising:

obtaining the depth data of the voxel structure after arranging the depth data from which the distortion has been removed, based on a coordinate system of a space.

19. The method of claim 11, further comprising:

generating a three-dimensional (3D) mesh, based on a marching cubes algorithm.

20. One or more non-transitory computer-readable storage media storing computer-executable instructions that, when executed by a processor of an electronic device individually or collectively, configure the electronic device to perform operations, the operations comprising:

obtaining at least one piece of location information about the electronic device through at least one sensor;

obtaining color data of a voxel structure, based on color data about an image obtained through a camera and the at least one piece of location information;

obtaining truncated signed distance field (TSDF) data of the voxel structure, after removing a distortion of depth data about the image obtained through the camera based on a type of the camera and the at least one piece of location information; and obtaining color data and TSDF data about at least one voxel within a truncation distance, based on the color data of the voxel structure and the TSDF data of the voxel structure.

* * * * *